United States Patent [19]

Mahin et al.

[11] Patent Number: 5,761,719
[45] Date of Patent: Jun. 2, 1998

[54] ON-CHIP MEMORY MAP FOR PROCESSOR CACHE MACRO

[75] Inventors: Stephen William Mahin, Underhill; Kevin William McCullen; Sebastian Theodore Ventrone, both of Jericho; Daniel Mathew Wronski, Essex Junction, all of Vt.

[73] Assignee: International Business Machines Corporation, Armonk, N.Y.

[21] Appl. No.: 468,885

[22] Filed: Jun. 6, 1995

Related U.S. Application Data

[63] Continuation of Ser. No. 252,632, Jun. 2, 1994, abandoned, which is a continuation of Ser. No. 738,705, Jul. 31, 1991, abandoned.

[51] Int. Cl.$^6$ .................................................. G06F 12/08
[52] U.S. Cl. .......................... 711/139; 711/138; 711/145
[58] Field of Search .................................. 395/465, 466, 395/472

[56] References Cited

U.S. PATENT DOCUMENTS

| | | | |
|---|---|---|---|
| 4,357,656 | 11/1982 | Saltz et al. | 711/138 |
| 4,485,457 | 11/1984 | Balaska et al. | 711/5 |
| 4,740,889 | 4/1988 | Motersole et al. | 711/138 |
| 4,794,523 | 12/1988 | Adan et al. | 395/653 |
| 4,794,524 | 12/1988 | Carberry et al. | 395/800.32 |
| 4,805,097 | 2/1989 | De Sanna | 711/206 |
| 4,908,789 | 3/1990 | Blokkum et al. | 711/172 |
| 4,921,630 | 5/1990 | Cochcroft, Jr. | 435/264 |
| 4,926,316 | 5/1990 | Baker et al. | 711/2 |
| 4,951,248 | 8/1990 | Lynch | 711/2 |
| 4,953,073 | 8/1990 | Moussouris et al. | 711/3 |
| 5,155,816 | 10/1992 | Kohn | 711/138 |
| 5,210,847 | 5/1993 | Thome et al. | 711/138 |
| 5,210,850 | 5/1993 | Kelly et al. | 395/727 |
| 5,297,270 | 3/1994 | Olson | 711/139 |
| 5,353,431 | 10/1994 | Doyle et al. | 711/206 |

OTHER PUBLICATIONS

INTEL, "Cache Turtorial" Intel Corporation 1990; chapter 4, 1990.

*Primary Examiner*—Eddie P. Chan
*Assistant Examiner*—Reginald G. Bragdon
*Attorney, Agent, or Firm*—Heslin & Rothenberg, P.C.

[57] ABSTRACT

A computer processor architecture which employs an on-chip cache macro and an on-chip memory map is described. The memory map contains indicia of the cachability of different segments of off-chip memory, preferably along with an indication of the read/write status of each off-chip memory segment. A processor generated address signal is then compared on-chip with the memory map to ascertain whether the generated signal falls within a segment which is cachable or uncachable and which is read-only or read/write.

11 Claims, 4 Drawing Sheets

ON-CHIP MEMORY MAP FOR PROCESSOR CACHE MACRO

This application is a continuation of application Ser. No. 08/252,632, filed Jun. 2, 1994, now abandoned, which itself is a continuation of application Ser. No. 07/738,705, filed Jul. 31, 1991, now abandoned.

BACKGROUND OF THE INVENTION

1. Technical Field

The present invention relates to computer processor architecture and, more particularly, to a computer processor architecture which employs an on-chip cache macro.

2. Description of the Prior Art

Present computer designs frequently have a very large main memory address base which interfaces with the CPU through a cache memory. Descriptions of the various uses and methods of employing caches appear throughout the open literature, for example, reference U.S. Pat. Nos. 4,953,073; 4,485,457; and 4,912,630. A cache memory architecture can be thought of as comprising four basic building blocks or modules: a unit for generating addresses (which may comprise the entire CPU), a memory management unit (MMU) for signaling the generated address as cachable or uncachable, cache data and tag memory for storing recently used cachable information, and tag comparator logic for determining whether a hit or a miss has occurred. In older architectures, all of these modules were separately disposed on individual chips or even separate boards. Recently, however, all but the memory management unit are typically integrated into the computer processing chip. Cachability definition is traditionally assigned to the MMU, for example, to prevent reading memory data into the cache memory or to prevent writing data into the cached copy of ROM space.

Traditionally, the processor must send out a generated address to the memory management unit (which is hardwired) to determine whether or not a given region is cachable, preferably, before the end of a memory transfer cycle. Due to the dynamic nature of this function, it can become a critical path within the system and processor design. Another drawback to the use of an off-chip cache enable approach is the system hardware overhead required. The system has decode logic external to the chip decoding the address generated by the processor, determining whether or not the identified address region is cachable, and sending the cache enable signal back to the processor. In addition, if it is desirable to redefine the main memory configuration such that the cachability of regions change, it may be difficult to change the MMU system hardware used to identify a generated address as one or the other. Alternatively, if the addresses can be changed dynamically by I/O port writes, then the operating system software writer must be familiar with the actual system implementation for this function. If systems are inconsistent between product lines then the operating system code writers must maintain unique codes for each system. Each initialization of a system may require unique debugging of this function.

To address the above-noted problems inherent in the external cache enable implementation, the present invention performs the cache enable function internal to the processor chip, i.e., on-chip.

SUMMARY OF THE INVENTION

Briefly described, the present invention comprises a new, single-chip computer processor architecture which employs an on-chip cache macro and an on-chip memory map. The single-chip processing system is coupled to off-chip memory means, which is preferably subdivided into a plurality of segments. The single-chip system includes a processor circuit coupled to the off-chip memory means for communicating therewith via a generated address signal. A cache memory is associated with the processor circuit and a memory map is provided containing indicia of which segments of the off-chip memory means are cachable and which segments of the off-chip memory means are uncachable. Memory map referencing means allows the determination of whether a generated address signal corresponds to an off-chip memory segment which is cachable or uncachable. As an enhancement, the memory map is preferably configured to include indicia of which segments of the off-chip memory means are read-only and which segments of the off-chip memory means are read/write. Further circuit details are described and claimed herein. For example, at least one control register may be used to map the off-chip memory means.

In another aspect of the present invention, a method for identifying on-chip the cachability of a processor generated address signal is provided. The method is employed in a single-chip processing system which has a cache memory and a processor circuit associated therewith. The processor circuit is coupled to off-chip memory means (which has a plurality of segments) and communicates therewith via generated address signals. The method includes the steps of: providing an on-chip control register coupled to the processor circuit; mapping the cachability of the memory means segments into the control register; and referencing the control register memory map whenever the processor circuit generates an address signal to determine whether the corresponding off-chip memory means segment is cachable or uncachable. Enhanced method processing steps are also described and claimed herein.

The present invention, whether circuit or method, features the creation of an on-chip memory map which contains indicia of which regions of memory can be cached and which regions of memory are read/write, thereby eliminating the need for specialized hardware processing external to the chip. The on-chip memory map includes control registers which are software controlled for easy reconfiguration, for example, should the cachable regions of the external memory change. The invention can apply to any processor chip having on-board cache macros. Because processing is all on-chip, determination of whether a region is cachable or uncachable is no longer a critical path within the processor design. Further, because the cachability determination operation is on-chip the processor can be pin for pin compatible with previous processor implementations lacking an on-board cache.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

DETAILED DESCRIPTION OF THE INVENTION

Figure 1:
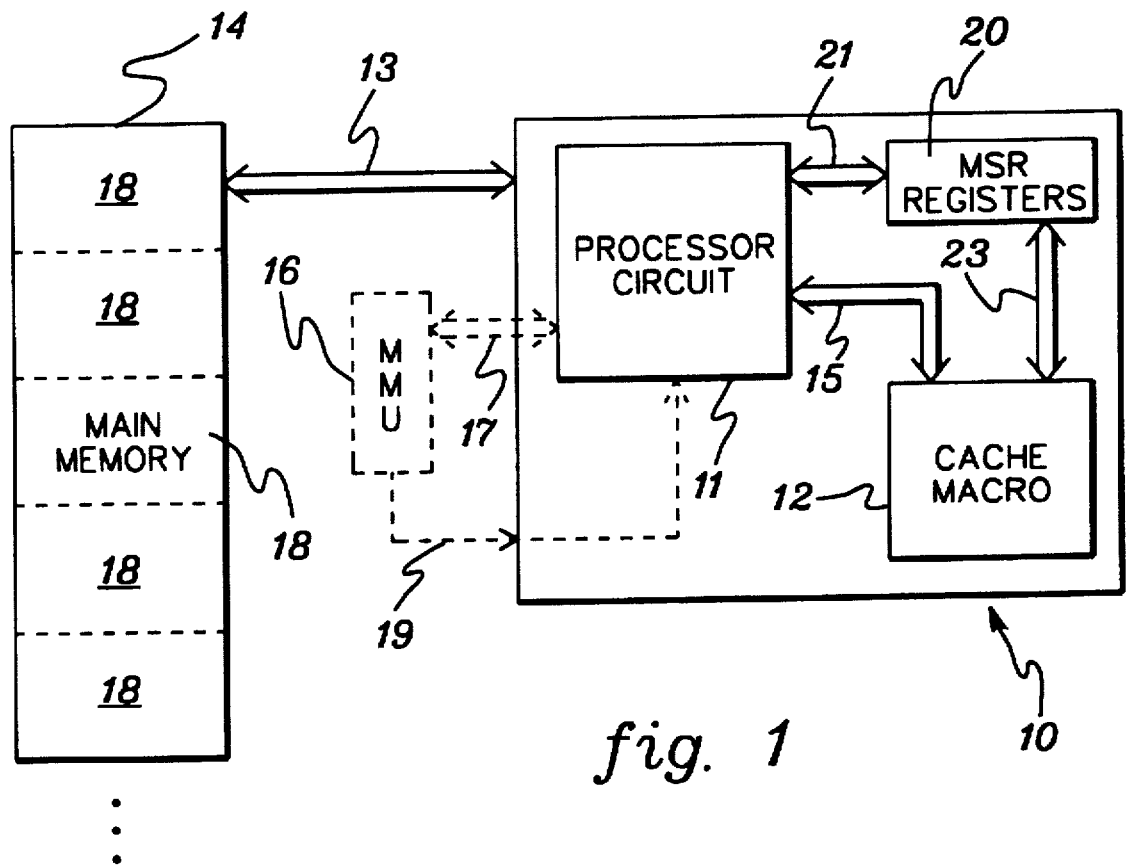
FIG. 1 is a block diagram representation of a portion of a processor unit, including a single processor chip and an off-chip main memory and memory management unit.

Referring to FIG. 1, a single-chip processor system, denoted 10, having an on-chip cache macro 12 must be able to define which regions of off-chip main memory 14 can be written into the cache memory of macro 12 (i.e., are cachable). This definition is necessary to prevent reading external memory data into the cache memory which may not comprise random access memory (RAM) space, e.g., read-only memory (ROM) space. Traditionally, a memory management unit (MMU) 16 (shown in phantom) off-chip from processor chip 10 is provided to define for processor circuit 11 the cachable regions of main memory 14. This is typically a dynamic process in which processor circuit 11 sends out a memory address on a bus 17 to MMU 16 which then defines through internal logic hardware whether or not the identified address region is cachable and returns a signal on a line 19 to circuit 11. Preferably, the signal is returned on line 19 before the end of the memory transfer cycle. In most applications, MMU 16 also provides circuit 11 with a read-only or read/write signal for each generated address. Because of its dynamic off-chip nature, this address decoding function is often a critical path within the overall system processor design.

Pursuant to the present invention, the problems inherent in off-chip cache enable decoding are eliminated by providing on-chip cache enable and read/write control logic in existing microprocessor chip architecture. In one important aspect, on-chip control registers, referred to herein as model specific registers (MSR) 20, are used. The new registers are coupled to processor circuit 11 via a bus 21 and to cache macro 12 via a bus 23. Registers 20, which are described further below, contain on-chip indicia of the amount and nature of each region of off-chip main memory 14. This information comprises a "memory map" inside microprocessor system 10 which is used as a substitute for the prior art external hardware and pins (cachability and read/write) in most, if not all, existing processors of comparable size having on-chip caches.

With each reference to a main memory address, before accessing macro 12 via line 15 circuit 11 must determine whether the requested address comprises cachable or uncachable memory and, preferably, whether it comprises read/write or read-only memory. If the memory address request is to an uncachable storage location, then cache macro 12 does not participate in the memory request and circuit 11 communicates directly with main memory 14 via bus 13. Further, if the memory address request is to read-only storage, then the cache memory flags its copy of the corresponding data as read-only. One embodiment of a static memory map 20 pursuant to the present invention is depicted in FIG. 2.

By way of example, the embodiment described herein assumes a typical '386 microprocessor system having access to four megabytes of main memory, of which no read-only memory exists above the one megabyte address line. Below the one megabyte address line, memory can be flagged as cachable or uncachable and as read-only or read/write. Preferably, main memory 14 is subdivided into multiple segments 18 (FIG. 1), for example, each comprising 64 kilobytes of memory. (Any desired alternate memory segment size could also be selected. The segment size is preferably selected to reduce on-chip control registers to a reasonable number of bits.) Above the one megabyte address line, memory is assumed to be read/write and is flagged as either cachable or uncachable, again in 64 kilobyte blocks or segments. Registers 20 in essence define a static memory map which may be referenced by the processor circuit whenever accessing a particular address line of the main memory. New control registers, i.e., registers 20, are added to system 10 to ensure no compatibility problems with existing microprocessor designs. However, if appropriate existing registers are available, they may be assigned to operate as described herein.

Figure 2:
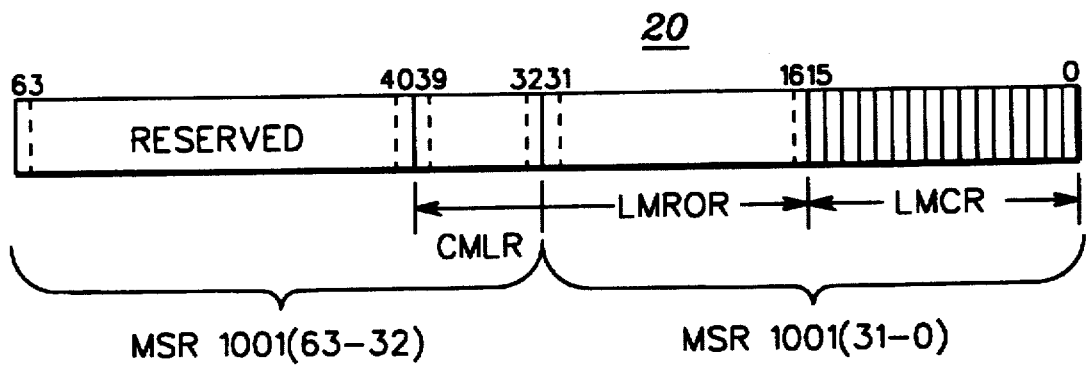
FIG. 2 is a block diagram representation of one embodiment of control registers pursuant to the present invention for the single processor chip of FIG. 1.

In the embodiment of FIG. 2, registers 20 are divided into two 32 bit control registers, herein referred to as MSR 1001(31-0) and MSR 1001(63-32). The first control register, MSR 1001(31-0), is further subdivided into two 16 bit registers. The first of these registers is a "Lower one Meg Control Register" (LMCR) which contains cachable/ uncachable indicia for segments in the first one megabyte of memory space. For example, if bit (0) is set (i.e., equal to '1') in the LMCR, then the first 64k region of memory is referenced as cachable. Conversely, if it is unset (i.e., equal to '0') then the first 64k region of memory is referenced as uncachable. As a further example, if bit (1) is set then the region from 64k to 128k is referenced as cachable. If both bits (0) and (1) are set, then the memory region from 0 to 128k would be cachable. Hence, each bit from (0) to (15) in LMCR contains cachability indicia for a corresponding 64k region of memory from zero to one megabyte.

The second 16 bit register, MSR 1001(31-0), comprises a 16 bit "Lower one Meg Read-only Register" (LMROR) which contains indicia of whether the main memory segments from zero to one megabyte are read-only or read/ write. A segment region in main memory can be designated as read/write only if the corresponding bit in the LMCR register is enabled.

As noted above, it is assumed for discussion that main memory 14 (FIG. 1) contains a contiguous block of cachable memory beginning at one megabyte. Above one megabyte and outside of this contiguous block, it is assumed that memory is uncachable. The second control register, MSR 1001(63-32), contains indicia defining the size of this contiguous region of cachable memory above one megabyte. This register, which is referred to as the "Cache Memory Limit Register" (CMLR), contains an absolute binary number equal to the number of 64k segments in the continuous block which are cachable. Any remaining region above this contiguous region of cachable memory segments is assumed to be uncachable. (Those skilled in the art will recognize that the inventive techniques described herein are equally valid for other architectural configurations as well.)

Figure 3:
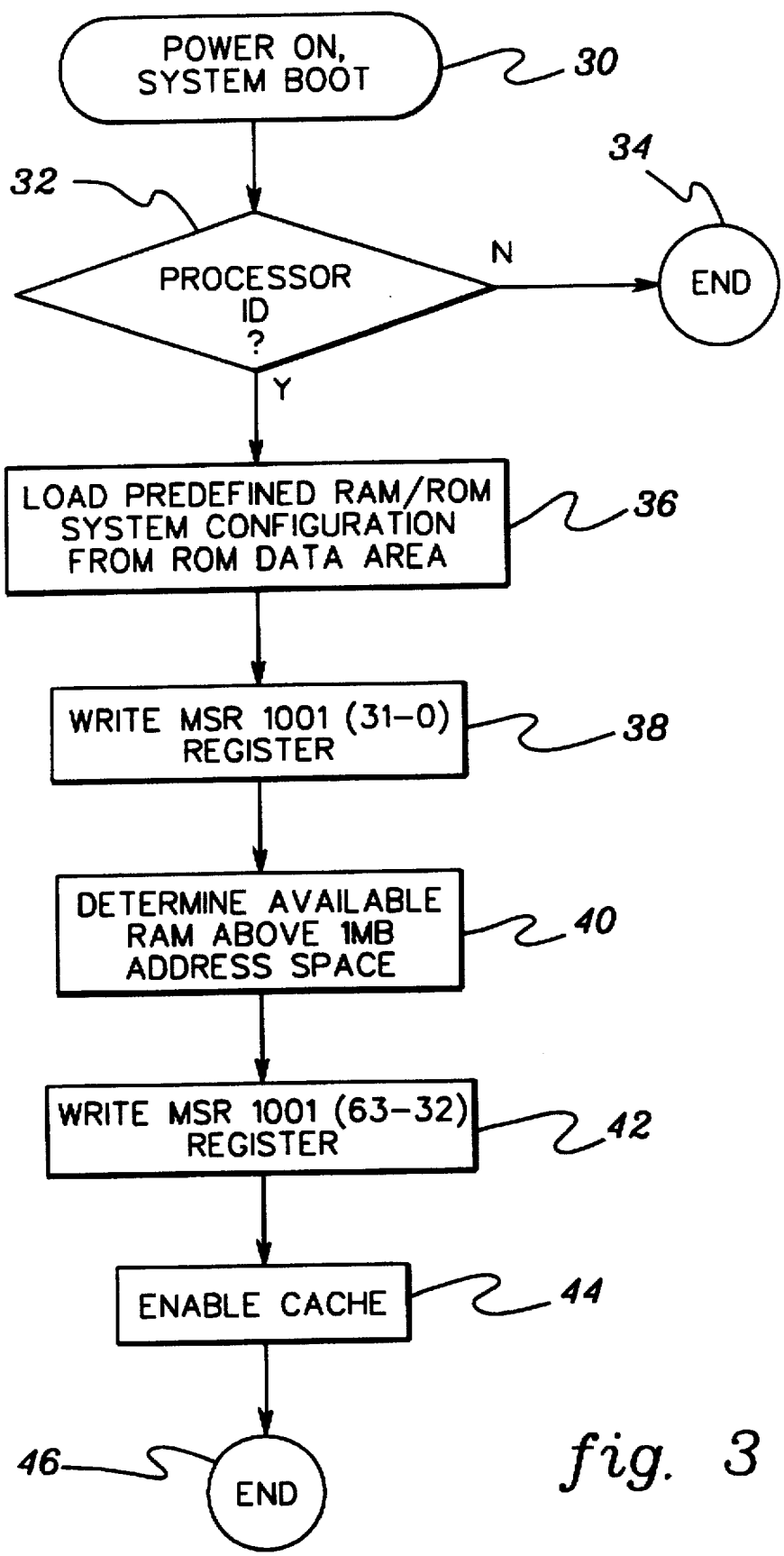
FIG. 3 is a flowchart of one embodiment of the initial memory mapping function pursuant to the present invention.

One operational embodiment for loading the appropriate indicia in control registers MSR 1001(31-0) and MSR 1001(63-32) is depicted in FIG. 3. After a hard reset ("Power On, System Boot" 30), the first control register is initialized to '0' which is defined to set all the area below one megabyte (i.e., registers LMCR and LMROR) as uncachable and read/write. The second register is also initialized to '0' which sets all the memory above the one megabyte address region (i.e., register CMER) as uncachable. The system code then updates these registers with the cachable memory regions for the on-board cache. This initialization method requires the system designer to designate which regions of memory are cachable, which is an operation readily implementable in software code by one skilled in the art. In the IBM PS/2 processor line the system configuration registers (known as POS registers) are read and used to determine the amount and nature of main memory. This information is used to build the system memory map inside the processor chip.

Thereafter, inquiry is made whether the unit's processor chip is memory map programmable as provided herein, 32 "Processor ID?". Appropriate processor identification information could be stored as part of the system boot code and incorporated into ROM. If the processor is not identified, for example, because it comprises a conventional Intel '386 or '486 chip, then on-chip mapping cannot be accomplished and memory map processing is discontinued, 34 "End." Assuming that the processor is appropriately identified as being capable of receiving a memory map (e.g., the processor has the necessary control registers), then the next step in the mapping process is to load the predefined RAM/ROM system configuration, 36 "Load Predefined RAM/ROM System Configuration From ROM Data Area," and thereafter to write the appropriate cachability and read/write indicia to the first control register MSR 1001(31-0), 38 "Write MSR 1001(31-0) Register." Next, the processor determines from the loaded system configuration the available RAM space above the one megabyte address line, 40 "Determine Available RAM Space Above one Megabyte Address," and writes this information to the second of the main control registers, 42 "Write MSR 1001(39-32) Register." After writing to the model specific registers, the cache macro is enabled, 44 "Enable Cache" and initialization sequencing of the control registers is terminated, 46 "End."

Figure 4:
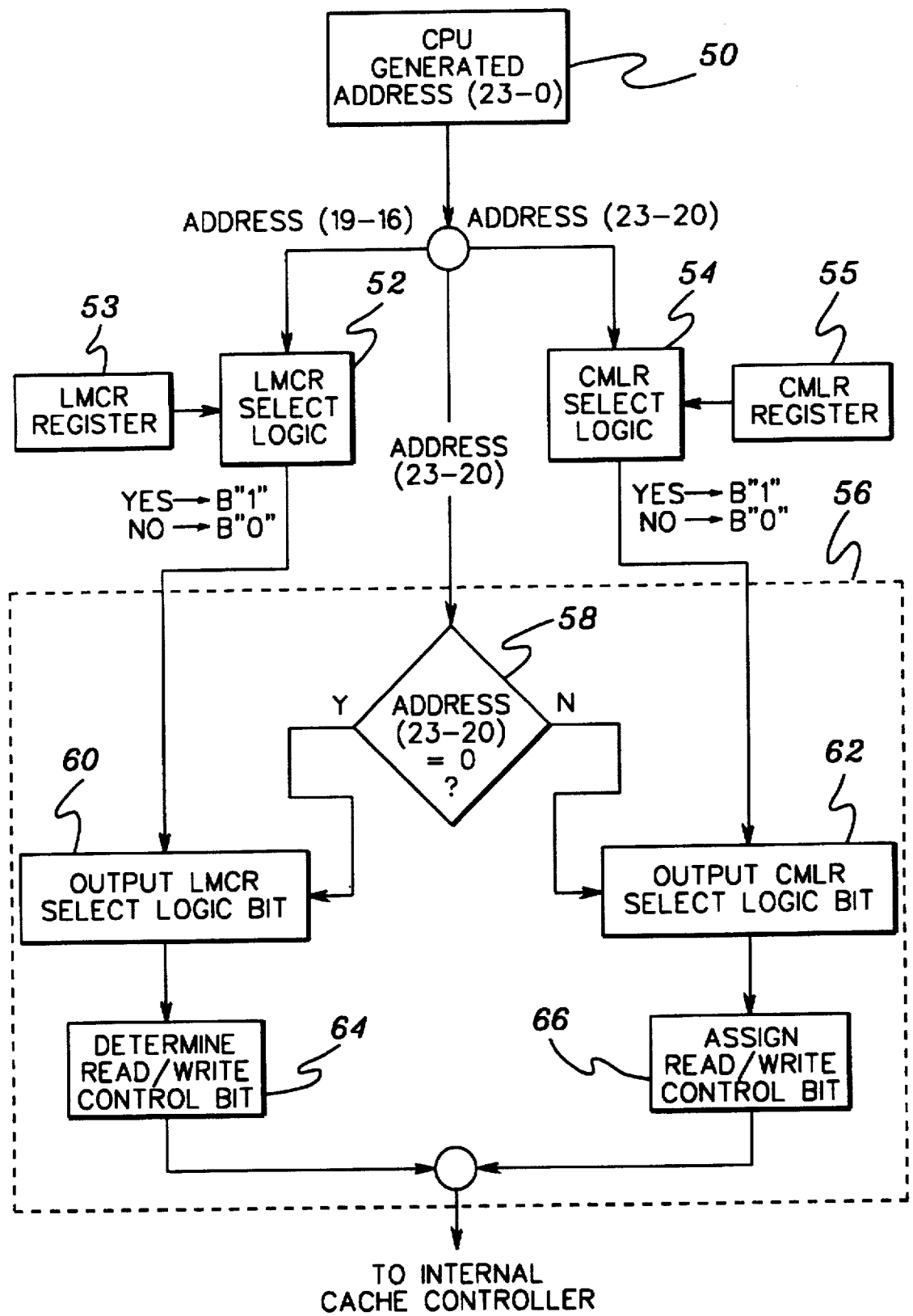
FIG. 4 is a hybrid flowchart/apparatus diagram representing one embodiment of address signal processing pursuant to the present invention.

One control register monitoring approach is depicted in FIG. 4. In this approach, compare logic is used to determine whether a particular generated address is cachable. By way of example, assuming a 24 bit address is generated by the CPU, the first 16 bits of the signal (i.e., bits (0)–(15)) equal 64k, which is the size of a segment or region of main memory as used herein. Thus, bits (16)–(19) identify main memory segments from zero to one megabyte, while bits (20)–(23) identify main memory segments from one megabyte up to 16 megabytes. (The concepts described herein are readily extendable to a main memory having greater than 16 megabytes or to a main memory divided into different sized segments.) The CPU generated address (23-0), 50 "CPU Generated Address (23-0)," is initially subdivided, with address bits (19)–(16) being fed to an LMCR logic circuit, 52 "LMCR Select Logic," and address bits (23)–(20) fed to a CMLR logic circuit, 54 "CMLR Select Logic."

Logic 52, which is also coupled to receive the lower one megabyte memory map from LMCR control register 53, compares the generated address between bits (16) through (19) with the stored indicia and generates a set bit signal (i.e., equal to '1') if the control register designates the corresponding segment containing the address as cachable or, conversely, an unset bit signal (i.e., equal to '0') if the corresponding address is designated as uncachable. Simultaneous with this operation, CMLR select logic 54, which receives indicia from CMLR control register 55, is making a comparison of whether the corresponding address line alternatively falls within the cachable memory region of the n contiguous segments of main memory beginning at one megabyte. If "yes", then a bit '1' is output and if "no", then a bit '0' is output. Obviously, should the designated address line be below one megabyte, then the output of logic 54 will be a bit '0'.

The output signals from logic circuits 52 and 54 are fed to comparator logic 56 which initially determines whether the designated address line is above or below one megabyte, 58 "Address (23-20)=0?". If "yes", then the LMCR select logic bit is output 60 to the internal cache controller, along with the corresponding read-only or read/write signal from LMROR, 64 "Determine Read/Write Control Bit." Conversely, if the address is above one megabyte then the output from logic circuit 54 is selected for output 62 to the internal cache controller. Again, addresses above one megabyte are assumed to be read/write memory, 66 "Assign Read/Write Control Bit."

Figure 5:
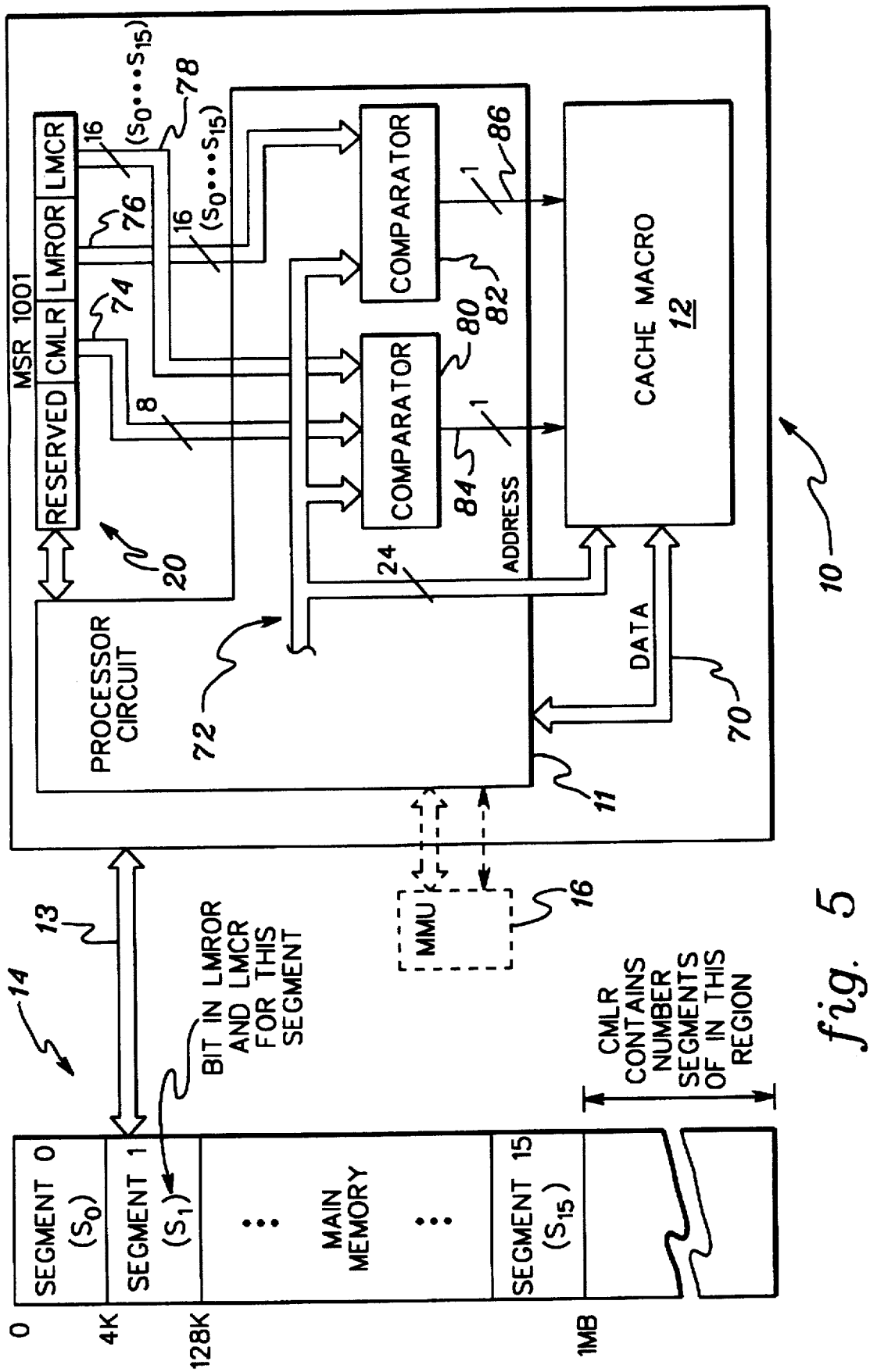
FIG. 5 is a block diagram depicting exemplary functional units of the present invention.

FIG. 5 (wherein elements referred to above are designated with the same reference numerals) depicts, in greater detail, exemplary functional units of the present invention. Chip 10 has processor 11, cache macro 12, and the model specific registers ("MSR") 20 thereon. Main memory 14, divided into segments, supports chip 10 via bus 13. Processor circuit 11 drives address bus 72 and data bus 70, which buses are also coupled to cache 12. Pursuant to the present invention, comparator circuits 80 and 82, connected, e.g., within processor 11, have available thereto the information from address bus 72 and registers 20. Pursuant to the compare operations discussed above with reference to FIG. 4, comparators 80 and 82 produce cachable/uncachable logic 84 and read/write logic 86, which can be made available to the remainder of the processor 11 and/or the cache 12, depending on the particular implementation. Comparator 80 produces the cachable/uncachable logic 84, and is therefore coupled (in parallel) to each of the bits in the CMLR and LMCR registers (discussed above) via lines 74 and 78, respectively. Similarly, comparator 82 produces the read/write logic 86, and is therefore coupled (in parallel) to each of the bits in the LMROR register (discussed above) via lines 76. Those skilled in the art will recognize that other arrangements of this or similar circuitry may be provided without departing from the scope of the present invention.

From the above discussion, it will be observed that a circuit and corresponding method are provided herein featuring the creation of an on-chip memory map containing indicia of which regions of memory can be cached and which regions of memory are read/write. The on-chip memory map includes control registers which are software controlled for easy reconfiguration, for example, should the cachable regions of external memory change. Further, since processing is all on-chip, determination of whether a region is cachable or uncachable is no longer a critical path within the processor design.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A single-chip computer processing system coupled to off-chip memory means, said memory means having a plurality of segments, said single-chip system comprising:

a processor circuit coupled to said off-chip memory means for communicating therewith via a generated address signal;

a cache memory associated with said processor circuit;

a memory map comprising a first control register having a plurality of bits, each bit of said plurality of bits mapped to a different respective segment of said off-chip memory means and comprising an indicia of whether said different respective segment is one of cachable and uncachable; and a comparator circuit having a dedicated connection to each bit of said first control register such that said comparator circuit is parallel connected to said memory map, said comparator circuit also being connected to said processor circuit for receiving said generated address signal, said comparator circuit comparing states of the plurality of bits of the first control register comprising said memory map to said generated address signal to determine whether a corresponding off-chip memory means segment is cachable or uncachable; and wherein said memory map further includes indicia of which segments of said off-chip memory means are read-only and which segments of said off-chip memory means are read/write.

2. The single-chip computer processing system of claim 1, wherein said memory map includes a second control register, said second control register having n bits, each of said n bits corresponding to a different one of said segments of said off-chip memory means, said second control register containing said indicia of which segments of said off-chip memory means are read-only and which segments of said off-chip memory means are read/write, each bit of said second control register having a dedicated connection to said comparator circuit for comparison to said generated address signal.

3. The single-chip computer processing system of claim 2, wherein said memory map is operationally independent of any memory management unit memory map.

4. The single-chip computer processing system of claim 2, wherein said off-chip memory means contains memory above a predetermined address, and wherein said first control register contains cachability indicia for the segments of said memory means below said predetermined address, and said second control register contains read-only and read/write indicia for the segments of said memory means below said predetermined address.

5. The single-chip computer processing system of claim 4, wherein said off-chip memory means includes a contiguous region of memory above said predetermined memory address which is cachable, and said memory map further includes a third control register, said third control register containing a binary number of how many off-chip memory segments are in said contiguous region of cachable memory above said predetermined memory address.

6. The single-chip computer processing system of claim 5, wherein said memory map is operationally independent of any memory management unit memory map.

7. The single-chip computer processing system of claim 5, wherein said comparator circuit includes:

first selector circuitry for generating a cachability output using the bit value of said first control register corresponding to the memory means segment containing said processor generated address signal;

second selector circuitry for generating a cachability output using the indicia contained in said third control register representative of the number of cachable memory segments in said contiguous region above said predetermined memory address and said processor generated address signal; and decision circuitry coupled to receive the output from each of said first selector circuitry and said second selector circuitry and decide which of said outputs comprises a correct indication of whether the corresponding off-chip memory means segment is cachable or uncachable.

8. The single-chip computer processing system of claim 7, wherein said memory map is operationally independent of any memory management unit memory map.

9. The single-chip computer processing system of claim 1, wherein said memory map is operationally independent of any memory management unit memory map.

10. In a single-chip processing system having a cache memory and a processor circuit associated with said cache memory, said processor circuit being coupled to off-chip memory means having a plurality of segments, said processor circuit communicating with said memory means via a generated address signal, a method for identifying on-chip the cachability of a generated address signal, said method comprising the steps of:

providing an on-chip control register coupled to said processor circuit, said on-chip control register having a plurality of bits, each bit of said plurality of bits having a dedicated connection to said processor circuit such that said on-chip control register is parallel connected to said processor circuit;

mapping the cachability of said plurality of memory means segments into said control register such that each bit of said plurality of bits of said on-chip control register indicates the cachability of a different segment of said plurality of memory means segments, and said on-chip control register comprises a memory map;

referencing states of the plurality of bits of the on-chip control register comprising the memory map whenever said processor circuit generates an address signal to determine whether the corresponding off-chip memory means segment is cachable or uncachable; and mapping into said on-chip control register which of said plurality of segments of said off-chip memory means are read-only and which of said plurality of segments of said off-chip memory means are read/write.

11. The method of claim 10, wherein said on-chip control register is operationally independent of any memory management unit.

* * * * *